(12) United States Patent
Pinto et al.

(10) Patent No.: US 11,000,040 B2
(45) Date of Patent: May 11, 2021

(54) INSECT REPELLENT FORMULATION FOR SURFACE PROTECTION

(71) Applicant: IPEL—Itibanyl Produtos Especiais LTDA, São Paulo (BR)

(72) Inventors: Walter Piccirillo Pinto, Atibaia (BR); Giovanni Caritá Júnior, Atibaia (BR)

(73) Assignee: IPEL-ITIBANYL PRODUTOS ESPECIAIS LTDA, Sao Paulo (BR)

( * ) Notice: Subject to any disclaimer, the term of this patent is extended or adjusted under 35 U.S.C. 154(b) by 35 days.

(21) Appl. No.: 16/061,647

(22) PCT Filed: Feb. 15, 2017

(86) PCT No.: PCT/BR2017/050033
§ 371 (c)(1),
(2) Date: Jun. 12, 2018

(87) PCT Pub. No.: WO2017/139862
PCT Pub. Date: Aug. 24, 2017

(65) Prior Publication Data
US 2019/0307128 A1    Oct. 10, 2019

(30) Foreign Application Priority Data
Feb. 18, 2016 (BR) .................. 10 2016 003397-7

(51) Int. Cl.
| | | |
|---|---|---|
| *A01N 53/00* | (2006.01) | |
| *A01N 65/26* | (2009.01) | |
| *A01N 65/44* | (2009.01) | |
| *C09D 5/14* | (2006.01) | |
| *A01N 65/00* | (2009.01) | |

(52) U.S. Cl.
CPC .............. *A01N 53/00* (2013.01); *A01N 65/00* (2013.01); *A01N 65/26* (2013.01); *A01N 65/44* (2013.01); *C09D 5/14* (2013.01); *Y02A 50/30* (2018.01)

(58) Field of Classification Search
CPC .................................. A01N 65/00; C09D 5/14
See application file for complete search history.

(56) References Cited

U.S. PATENT DOCUMENTS

| | | | | |
|---|---|---|---|---|
| 3,071,550 | A * | 1/1963 | Altscher | ............... A01N 25/30 514/785 |
| 4,923,698 | A | 5/1990 | Rodero | |
| 5,827,522 | A * | 10/1998 | Nowak | ................. A01N 25/04 424/405 |
| 2013/0273129 | A1 | 10/2013 | Mateo Herrero | |

FOREIGN PATENT DOCUMENTS

| | | |
|---|---|---|
| CN | 1291075 | 4/2001 |
| CN | 1308863 | 8/2001 |
| CN | 103053596 | 4/2013 |
| CN | 103503909 | 1/2014 |
| EP | 1112687 A2 | 7/2001 |
| KR | 20010028567 A | 4/2001 |
| KR | 20130076116 A | 7/2013 |
| WO | 9941983 A1 | 8/1999 |
| WO | 2009033237 | 3/2009 |
| WO | 2009033237 A2 | 3/2009 |
| WO | WO-2009033237 A2 * | 3/2009 ......... A01N 2300/00 |

OTHER PUBLICATIONS

Ahn et al. KR 20010028567 A, published Apr. 6, 2001, machine translation.*
Korean Intellectual Property Office Action in Application 10-2018-7020937, dated Jul. 30, 2019 (English Translation Only).
CN; Chinese First Office Action in the CN Application No. 201780006843.3.
International Search Report and Written Opinion dated May 9, 2017 for PCT/BR2017/050033.

* cited by examiner

*Primary Examiner* — Gina C Justice

(57) ABSTRACT

The composition of a set of formulations based on synthetic active ingredients and natural boosting additives, which provide repellent action against flying insects such as mosquitoes, flies and black-winged stilts, as well as crawling insects such as cockroaches and ants.

7 Claims, 2 Drawing Sheets

INSECT REPELLENT FORMULATION FOR SURFACE PROTECTION

FIELD OF APPLICATION

This invention provides a formulation used as surface coating with repellent action against flying and crawling insects, combining synthetic active ingredients, additives, solvents, stabilizer and surfactants, in which said formulation may be included to products such as water-based and solvent-based coating compositions, wood laminate products, wallpapers and others.

"Most febrile illnesses on humans are caused by microorganisms transmitted by insects", says the Encyclopedia Britannica. The term "insect" indicates not only insects as such—six-legged animals, such as flies, fleas, mosquitoes, head lice and beetles—but also eight-legged creatures, such as mite and ticks. According to scientific classification, all said species fall into the most comprehensive category of arthropods—the largest division in the animal kingdom—including at least a million known species.

Most insects are harmless to humans, and some are quite useful, such as pollinators, and others that help in decomposing waste, among other functions. A large number of insects feed exclusively on plants, whereas some feed on other insects. Obviously, there are insects that are bothersome to humans, have painful stings or are simply numerous. Some may also cause damage to crops, and others may cause diseases and even death.

Insect transmitted diseases "have cause more deaths from the $17^{th}$ century up to the beginning of the $20^{th}$ century than all other causes of death combined", says Duane Gubler, from the Centers for Disease Control and Prevention of the United States.

Nowadays, about 1 out of 6 people is infected with an insect transmitted disease. Aside from the affliction, these diseases represent a large financial burden, particularly in developing countries, which are precisely those with the least resources. Even a single outbreak can be hugely costly. An epidemic at western India, in 1994, cost billions of dollars to local and world economy.

Insects may act as vectors—in other words, disease transmitting agents—in two particular forms, as follows:
  Mechanical transmission: Similarly, as people bring dirt from their shoes to their homes, houseflies may carry millions of microorganisms on their legs, which, depending on quantity, may cause diseases. Flies that landed on feces, for example, contaminate food and drink;
  Vectors: the transmission takes place when insects hosting viruses, bacteria or parasites infect victims by stinging or other means. Only a minor percentage of insects transmit diseases to humans in that manner. For example, although there are millions of different species of mosquitoes, only the *Anopheles* genus can transmit malaria—the second most deadly infectious disease in the world, after tuberculosis.

Some scientists foresee that the global warming will enable disease-transmitting insects to breed in currently colder environments. As it seems, this is already taking place. Dr. Paul R. Epstein, from the Center for Health and Global Environment of Harvard University, says: "Currently there are reports of incidence of insects and insect transmitted diseases (including malaria and dengue fever) in higher regions of Africa, Asia and Latin America." In Costa Rica, dengue fever has surpassed the mountainous barriers, which, not long ago, restricted the illness to the Pacific Coast, and now the entire country is affected.

In face of the aforementioned scenario, insect repellent coating materials may contribute in insect control and become an additional tool in fighting diseases and improving the quality of life for people. Furthermore, such functionality in a coating material is a differential feature, which aggregates value and technology to the product.

STATE OF THE ART

Various studies have been performed for insect repellent compositions, in order to achieve an effective product, harmless to humans and to the environment. An insect repellent composition for surfaces is described in document US 2015/0201615. This invention differs from US patent 2015/0201615 regarding the types of active ingredients and vehicles used. Moreover, this invention focuses on application to surfaces such as paint, laminate flooring and wallpapers, which differs from the application of the product mentioned in the North American patent, thus has relevant inventive step to the proposed application. The active ingredients selected in the object of this patent provide good compatibility and chemical stability for the proposed applications.

DETAILED DESCRIPTION OF THE INVENTION

Figure 1:
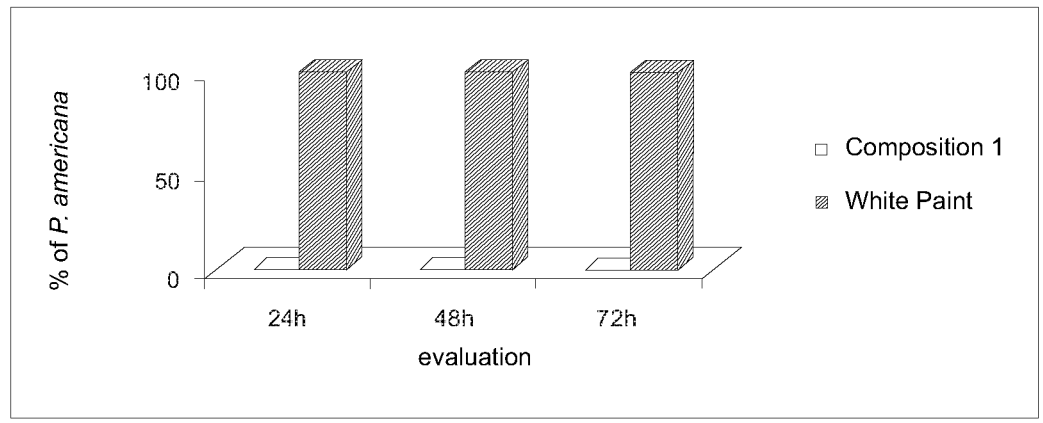
FIG. 1 shows a chart with repellency results and performance at time 0 against *Periplaneta Americana* (house roach) using composition 1.
Figure 2:
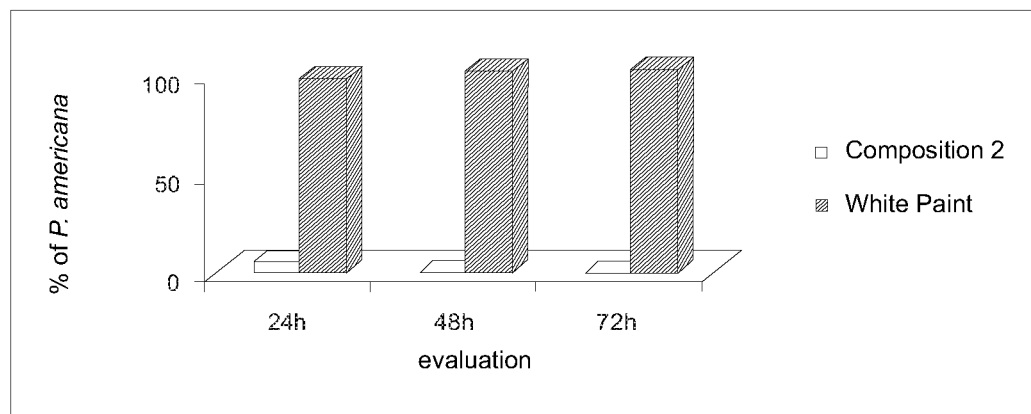
FIG. 2 shows a chart with repellency results and performance at time 0 against *Periplaneta Americana* (house roach) using composition 2.
Figure 3:
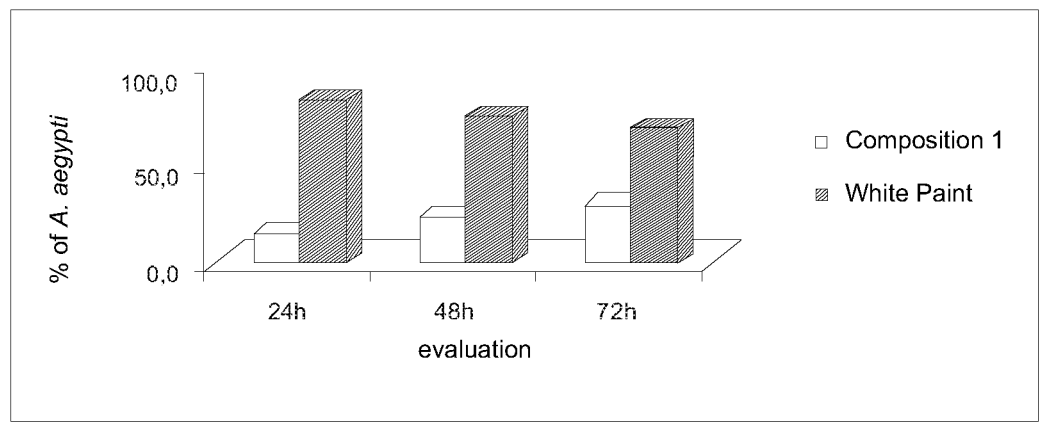
FIG. 3 shows a chart with repellency results and performance at time 0 against *Aedes aegypti* using composition 1.
Figure 4:
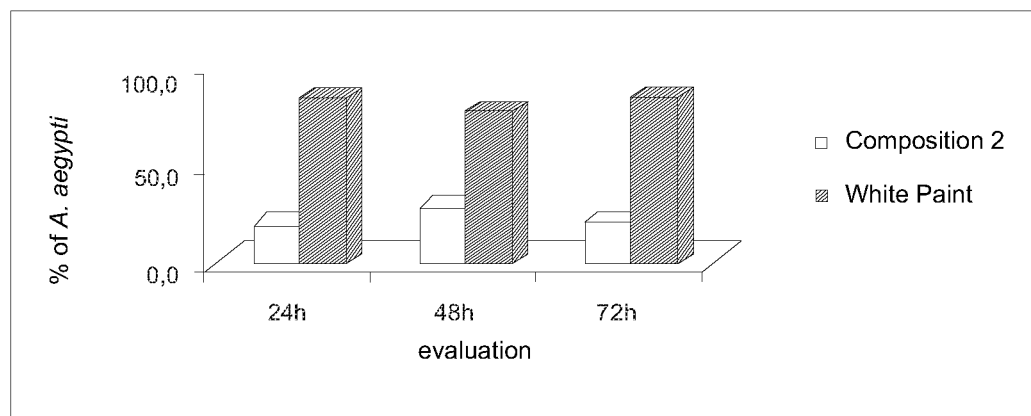
FIG. 4 shows a chart with repellency results and performance at time 0 against *Aedes aegypti* using composition 2.

Some natural active ingredients, which also include insect repellent properties, were also evaluated. Some examples include the Neem oil, *Eucalyptus* oil, lemongrass (essential oils), among others.

Afterwards, drawing on some of the work already performed, formulations including said active ingredients and formulations including synthetic active ingredients such as pyrethrin and pyrethroid byproducts were prepared, which will be described in detail in the following examples, and water-based coating compatibility and stability evaluation work was launched (acrylic paint and PVA latex).

After the stability and compatibility test phase, paint samples were prepared and submitted to lab testing for proof of efficiency of the additive.

According to ANVISA [Brazilian Health Surveillance Agency], repellents are "products with repellent action against insects, for application to immovable surfaces and volatilization in environments with slow and continuous release of the active ingredient(s) by electric heating or other energy form, or even spontaneously", and the concept of insect repellency is different from insecticide action, as it does not kill the insect, but rather discourages the insect from landing or pushes it away from a certain surface.

There are various types of repellents available in the market directed at skin application or room protection, in which the release of the active ingredient is done by heating (repellent tablets or solutions that are released by electric devices) or even by burning as candles or coil repellents.

The development described herein features the compatibility of repellent active ingredients through formulations including additives, solvents, stabilizers and surfactants as innovation, enabling inclusion in products such as:
- water-based (acrylic, latex, styrene-acrylic, epoxy, alkyd, among others) and solvent-based (acrylic, epoxy, alkyd, among others) coating compositions;
- wood laminate products that include resin in their compositions, which may be used in producing furniture, tools, base trims, ceiling trims, etc.;
- surface coating paper, such as wallpapers;
- in order to provide rooms less susceptible to insect dwelling and development, contributing to the quality of life of users of said rooms or environments.

The composition comprises the following ingredients: permethrin or cypermethrin, glycol, hydrogenated castor oil and/or essential lemongrass oil, ethoxylate/propoxylate alcohol, anionic surfactants, namely calcium dodecylbenzenesulfonate and/or polyethylene-polypropylene monobutyl glycol ether. More particularly, the composition comprises the proportions listed in the following examples:

EXAMPLES AND RESULTS

Example 1—Additive Formulation with Repellent Action, Synthetic Base

Repellent additive composition, named composition 1, including:

| Compound | % weight | Addition order |
|---|---|---|
| Permethrin/Cypermethrin | 45.0-60.0 | 5 |
| Glycol (propylene glycol/dipropylene glycol) | 8.0-12.0 | 1 |
| Hydrogenated Castor Oil 40 EO | 10.0-15.0 | 4 |
| Ethoxylate/Propoxylate Alcohol | 4.0-7.0 | 3 |
| Calcium dodecylbenzenesulfonate and/or Polyethylene-polypropylene monobutyl glycol ether | 15.0-20.0 | 2 |

Stability and compatibility test results for water-based coatings (vinyl-acrylic resin) with Composition 1 at 1.00 and 1.50% dosages are as follows.

Methodology:
- Use of additives on PAINT 1 VINYL and PAINT 2 VINYL samples, with 1.00% and 1.50% dosages of the repellent additive composition 1;
- Advanced stability testing in oven at 45° C. for 14 days;
- Daily color and odor monitoring of the samples in humid state;
- pH measurement at the start and end of the stability period.

Results:

A—Sample: Water-Based Vinyl Paint

| (Ref.: RAM 1262/13) Sample: Vinyl 1 | | |
|---|---|---|
| Additives: | Color | Odor |
| Paint as such | WHITE (10% pH at 9.38 water) | CHARACTERISTIC |
| 1.00% Composition 1 | WHITE | CHARACTERISTIC |
| Day 2 | WHITE | CHARACTERISTIC |
| Day 3 | WHITE | CHARACTERISTIC |
| Day 4 | WHITE | CHARACTERISTIC |
| Day 5 | WHITE | CHARACTERISTIC |
| Day 6 | WHITE | CHARACTERISTIC |
| Day 7 | WHITE | CHARACTERISTIC |
| Day 8 | WHITE | CHARACTERISTIC |
| Day 9 | WHITE | CHARACTERISTIC |
| Day 10 | WHITE | CHARACTERISTIC |
| Day 11 | WHITE | CHARACTERISTIC |
| Day 12 | WHITE | CHARACTERISTIC |
| Day 13 | WHITE | CHARACTERISTIC |
| Day 14 | WHITE | CHARACTERISTIC |
| pH (10% solution in water) | | Initial: 9.34 Final: 9.31 |
| 1.50% Composition 1 | WHITE | CHARACTERISTIC |
| Day 2 | WHITE | CHARACTERISTIC |
| Day 3 | WHITE | CHARACTERISTIC |
| Day 4 | WHITE | CHARACTERISTIC |
| Day 5 | WHITE | CHARACTERISTIC |
| Day 6 | WHITE | CHARACTERISTIC |
| Day 7 | WHITE | CHARACTERISTIC |
| Day 8 | WHITE | CHARACTERISTIC |
| Day 9 | WHITE | CHARACTERISTIC |
| Day 10 | WHITE | CHARACTERISTIC |
| Day 11 | WHITE | CHARACTERISTIC |
| Day 12 | WHITE | CHARACTERISTIC |
| Day 13 | WHITE | CHARACTERISTIC |
| Day 14 | WHITE | CHARACTERISTIC |
| pH (10% solution in water) | | Initial: 9.34 Final: 9.34 |

Samples were kept in oven after 14 days of stability. Also, a film extension test was carried out, with no changes observed regarding aspect of the dry film.

Example 2—Additive Formulation with Synthetic-Based Repellent Action Additive Boosted with Natural Additives The incorporation of natural additives, aside from bolstering the additive action, increasing its action spectrum, provides a more sustainable product from the viewpoint of availability of plant-derived raw materials such lemongrass, Neem oil, among others.

Below is the description of a repellent additive composition, called composition 2, which comprises:

| Compound | % weight | Addition order |
|---|---|---|
| Permethrin/Cypermethrin | 40.0-50.0 | 5 |
| Glycol (propylene glycol/dipropylene glycol) | 8.0-12.0 | 1 |
| Essential Lemongrass oil | 10.0-12.0 | 6 |
| Hydrogenated Castor Oil 40 EO | 10.0-15.0 | 4 |
| Ethoxylate/Propoxylate Alcohol | 3.0-6.0 | 3 |
| Calcium dodecylbenzenesulfonate and/or Polyethylene-polypropylene monobutyl glycol ether | 12.0-17.0 | 2 |

Stability and compatibility test results for water-based coatings (vinyl-acrylic resin) with Composition 2 at 1.00 and 1.50% dosages are as follows:

| Additives: | Color | Odor |
|---|---|---|
| 1.00% Composition 2 | WHITE | REPELLENT ADDITIVE SLIGHT ODOR |
| Day 2 | WHITE | REPELLENT ADDITIVE ODOR |
| Day 3 | WHITE | REPELLENT ADDITIVE ODOR |
| Day 4 | WHITE | REPELLENT ADDITIVE ODOR |
| Day 5 | WHITE | REPELLENT ADDITIVE ODOR |
| Day 6 | WHITE | REPELLENT ADDITIVE SLIGHT ODOR |
| Day 7 | WHITE | REPELLENT ADDITIVE SLIGHT ODOR |
| Day 8 | WHITE | REPELLENT ADDITIVE SLIGHT ODOR |
| Day 9 | WHITE | REPELLENT ADDITIVE SLIGHT ODOR |
| Day 10 | WHITE | REPELLENT ADDITIVE SLIGHT ODOR |
| Day 11 | WHITE | REPELLENT ADDITIVE SLIGHT ODOR |
| Day 12 | WHITE | REPELLENT ADDITIVE SLIGHT ODOR |
| Day 13 | WHITE | REPELLENT ADDITIVE SLIGHT ODOR |
| Day 14 | WHITE | REPELLENT ADDITIVE SLIGHT ODOR |
| pH (10% solution in water) | | Initial: 8.78 Final: 9.02 |
| 1.50% Composition 2 | WHITE | REPELLENT ADDITIVE SLIGHT ODOR |
| Day 2 | WHITE | REPELLENT ADDITIVE ODOR |
| Day 3 | WHITE | REPELLENT ADDITIVE ODOR |
| Day 4 | WHITE | REPELLENT ADDITIVE ODOR |
| Day 5 | WHITE | REPELLENT ADDITIVE ODOR |
| Day 6 | WHITE | REPELLENT ADDITIVE ODOR |
| Day 7 | WHITE | REPELLENT ADDITIVE ODOR |
| Day 8 | WHITE | REPELLENT ADDITIVE ODOR |
| Day 9 | WHITE | REPELLENT ADDITIVE ODOR |
| Day 10 | WHITE | REPELLENT ADDITIVE ODOR |
| Day 11 | WHITE | REPELLENT ADDITIVE ODOR |
| Day 12 | WHITE | REPELLENT ADDITIVE ODOR |
| Day 13 | WHITE | REPELLENT ADDITIVE ODOR |
| Day 14 | WHITE | REPELLENT ADDITIVE ODOR |
| pH (10% solution in water) | | Initial: 8.73 Final: 8.91 |

Samples were kept in oven after 14 days of stability. Also, a film extension test was carried out, with no changes observed regarding aspect of the dry film.

After the film dried, odor was no longer noticeable, allowing application of the coating without restrictions.

The invention claimed is:

1. A formulation for use as a repellent additive applied to a surface for repelling crawling and flying insects, comprising:
   45% to 60% by weight of the formulation selected from the group consisting of permethrin, cypermethrin, and a mixture of permethrin and cypermethrin;
   8% to 12% by weight of propylene glycol and/or dipropylene glycol;
   10% to 15% by weight of hydrogenated castor oil;
   3% to 7% by weight of propoxylate and/or ethoxylate alcohol; and
   12% to 20% by weight of calcium dodecylbenzenesulfonate and/or polyethylene-polypropylene monobutyl glycol ether.

2. The formulation according to claim 1 further comprising a natural additive selected from the group consisting of lemongrass oil, neem oil, andiroba oil, and a mixture of two or more thereof.

3. The formulation according to claim 2, wherein the natural additive(s) comprise from 10% to 12% by weight of the formulation.

4. A coated composition comprising:
   the formulation according to claim 1; and
   a composition;
   wherein the formulation is applied to a surface of the composition; and
   wherein the composition is selected from the group consisting of water-based and solvent-based compositions.

5. The coated composition according to claim 4, wherein the water-based composition is selected from the group consisting of acrylic, latex, styrene-acrylic, epoxy and alkyd.

6. The coated composition according to claim 4, wherein the solvent-based composition is selected from the group consisting of acrylic, epoxy and alkyd.

7. A coated product comprising:
   the formulation according to claim 1; and
   a product;
   wherein the formulation is applied to a surface of the product; and
   wherein the product is selected from the group consisting of a wood laminate product that includes resin in its composition and surface coating paper product.

* * * * *